No. 758,045. PATENTED APR. 26, 1904.
G. BRASELMANN & F. LÜNNEMANN.
APPARATUS FOR HEATING OR COOLING LIQUIDS.
APPLICATION FILED JULY 31, 1903.
NO MODEL. 5 SHEETS—SHEET 1.

Witnesses:
Fred E. Maynard.
Calderon C. Fuss.

Inventors:
Gustav Braselmann,
Fritz Lünnemann,
By their Attorney,
F. H. Richards.

No. 758,045. PATENTED APR. 26, 1904.
G. BRASELMANN & F. LÜNNEMANN.
APPARATUS FOR HEATING OR COOLING LIQUIDS.
APPLICATION FILED JULY 31, 1903.

NO MODEL. 5 SHEETS—SHEET 3.

Witnesses:
Fred. E. Maynard.
Calderon C. Fuss.

Inventors:
Gustav Braselmann,
Fritz Lünnemann,
By their Attorney,
F. W. Richards.

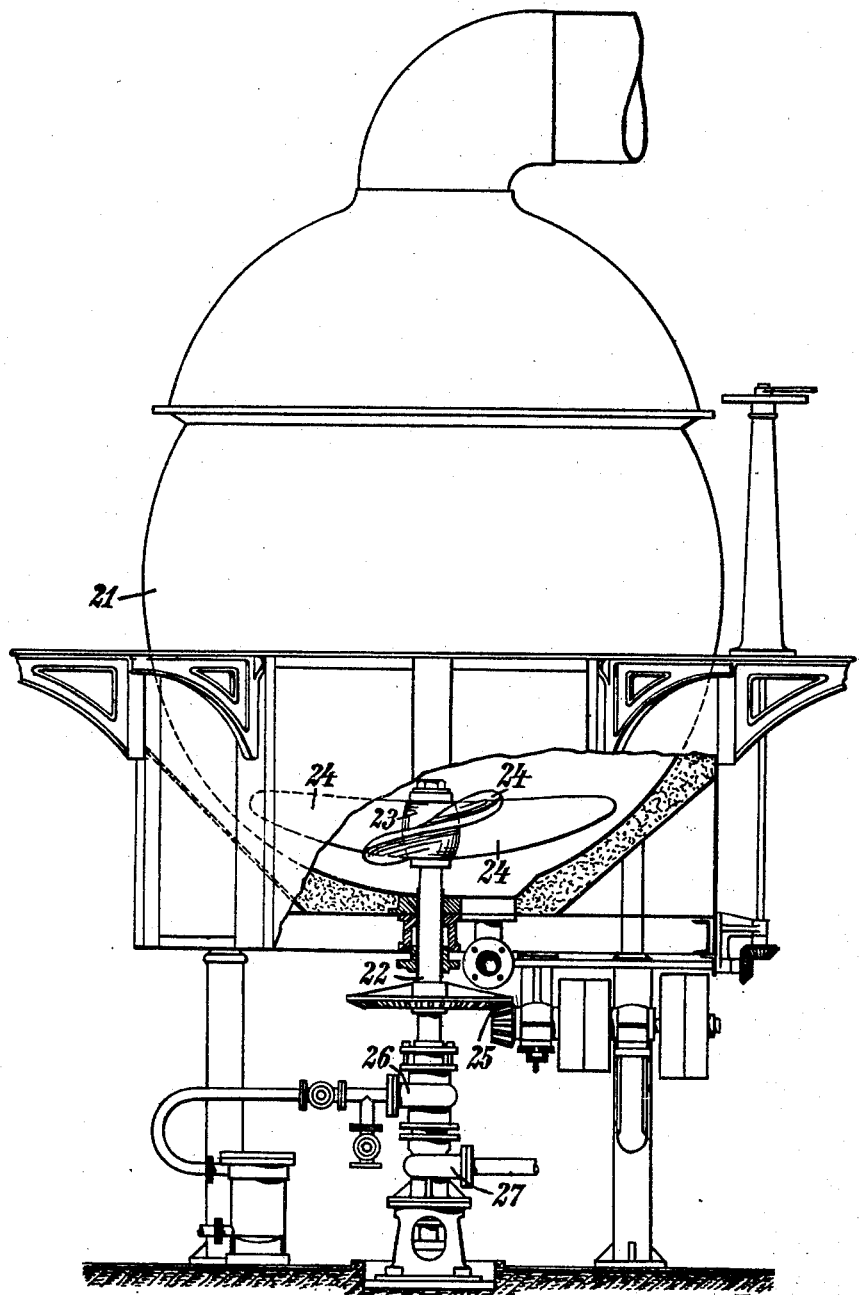

No. 758,045. PATENTED APR. 26, 1904.
G. BRASELMANN & F. LÜNNEMANN.
APPARATUS FOR HEATING OR COOLING LIQUIDS.
APPLICATION FILED JULY 31, 1903.
NO MODEL. 5 SHEETS—SHEET 5.
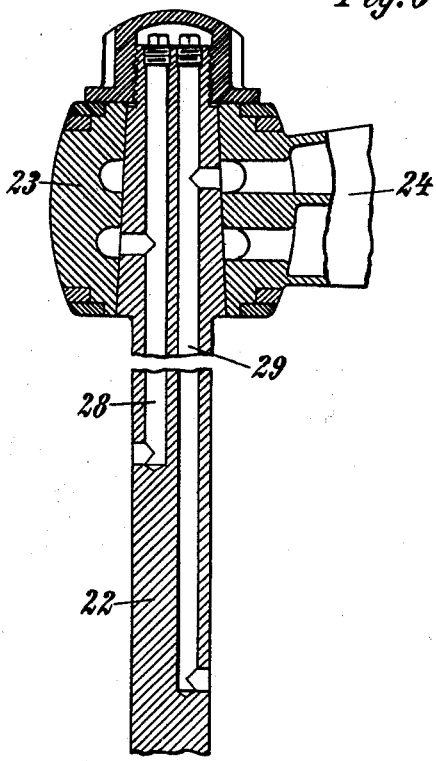
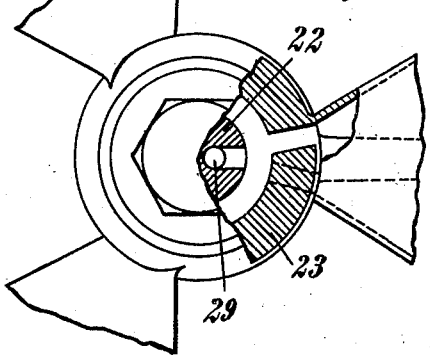

No. 758,045. Patented April 26, 1904.

UNITED STATES PATENT OFFICE.

GUSTAV BRASELMANN, OF DARMSTADT, AND FRITZ LÜNNEMANN, OF RUHRORT, GERMANY.

APPARATUS FOR HEATING OR COOLING LIQUIDS.

SPECIFICATION forming part of Letters Patent No. 758,045, dated April 26, 1904.

Application filed July 31, 1903. Serial No. 167,680½. (No model.)

*To all whom it may concern:*

Be it known that we, GUSTAV BRASELMANN, residing in Darmstadt, in the Grand Duchy of Hesse, and FRITZ LÜNNEMANN, residing in Ruhrort, in the Kingdom of Prussia, Germany, subjects of the Emperor of Germany, have invented certain new and useful Improvements in Apparatus for Heating or Cooling Liquids, of which the following is a specification.

This invention relates to improvements in apparatus for heating and cooling liquids, and more particularly to apparatus for heating mash-tuns; but the invention can also be used for heating or cooling purposes in many other branches of chemical engineering and the like.

In our invention the boiling of the mash is effected with the aid of a device similar to a ship's propeller, such as has already in other cases been used for stirring and mixing liquids. This propeller is arranged at the bottom of the tun so as to be rotatable about a vertical shaft and it is provided with ducts or the like, by means of which a heating agent, such as superheated steam, can be caused to flow through the blades.

Two forms of the invention are shown in the annexed drawings, in which—

Figure 1 is a vertical section of a mash-tun provided with the improved heating apparatus, and Fig. 2 a cross-section partly on the line B B of Fig. 1 and partly on the line C C of the same figure. Figs. 3 and 4 represent, respectively, a single blade of the propeller and the cone or boss by which the propeller is fixed to the shaft. Fig. 5 represents another form of the invention, and Figs. 6, 7, and 8 show details of the latter.

Inside the tun shown in Fig. 1 a vertical shaft 2 is arranged with bearings at its upper and lower ends. This shaft is longitudinally perforated, with the exception of a diaphragm 3, which is situated at the part at which the propeller is to be mounted on the shaft. The ducts in the shaft serve for the supply and exhaust of the heating agent. For this purpose in the bearings conduits 4 are provided, connected to the steam-supply pipe 5 and the exhaust-pipe 6 and condenser 7, respectively. The said conduits correspond to conduits 8 in the shaft-walls, through which the central bores communicate with the outer chamber. The conduits 4 are provided with stuffing-boxes 9.

The shaft 2 is driven by suitable means— for instance, worm-gear 10. A pipe 11, provided with a valve 12, adapted to be operated from the exterior by means of the shaft 13, serves for the charging and emptying of the tun. The propeller is arranged on a cone or boss 14 on the shaft 2 and comprises a hub portion 15 with the requisite number of blades 16 (two, three, four, or more) of the shape used for ships' propellers. The said blades are hollow and provided with a central partition 17, extending from the hub nearly to the point, so as to form, with the passages 18 and 19 of the hub, a self-contained canal, said passages 18 and 19 corresponding to bores leading to the central ducts of the shaft 2. The steam passing from the pipe 5 through the conduits 4 and 8 to the upper central duct of the shaft 2 thus flows through the passages 18 to the blades, through which it passes parallelly outward on one side of the partition and back on the other side and thence through the passages 19 to the lower central duct of the shaft 2 and through conduits 8 and 4 to the exhaust-pipe 6. The upper part of the shaft in contact with the mash has a protecting-jacket 20 to prevent burning of the mash.

Figs. 5 to 8 represent another form of construction which has over that described the advantage that there is no shaft passing through the interior of the tun which need be jacketed to protect the mash and which limits the space and interferes with cleaning. In this case the lower part of the shaft is provided with two ducts for supply and exhaust, respectively.

Fig. 5 is a complete view, and Figs. 6, 7, 8 details.

Figure 1:
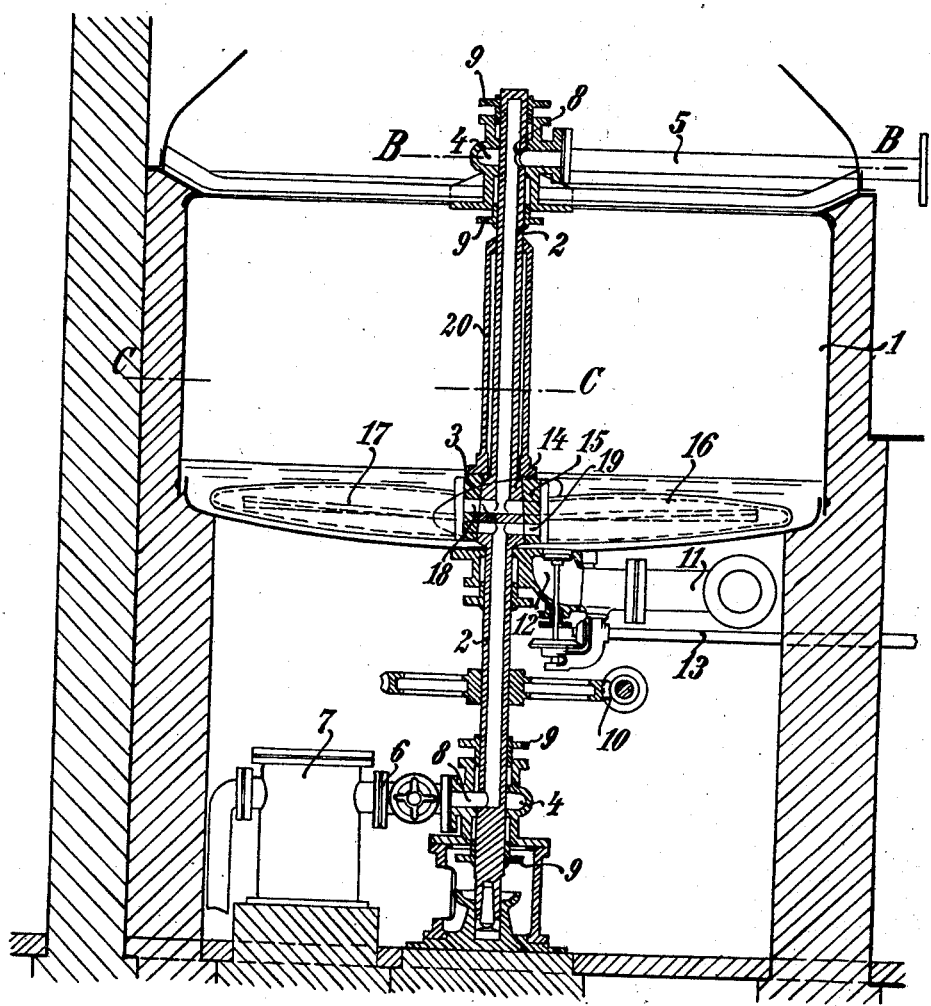
Figure 2:
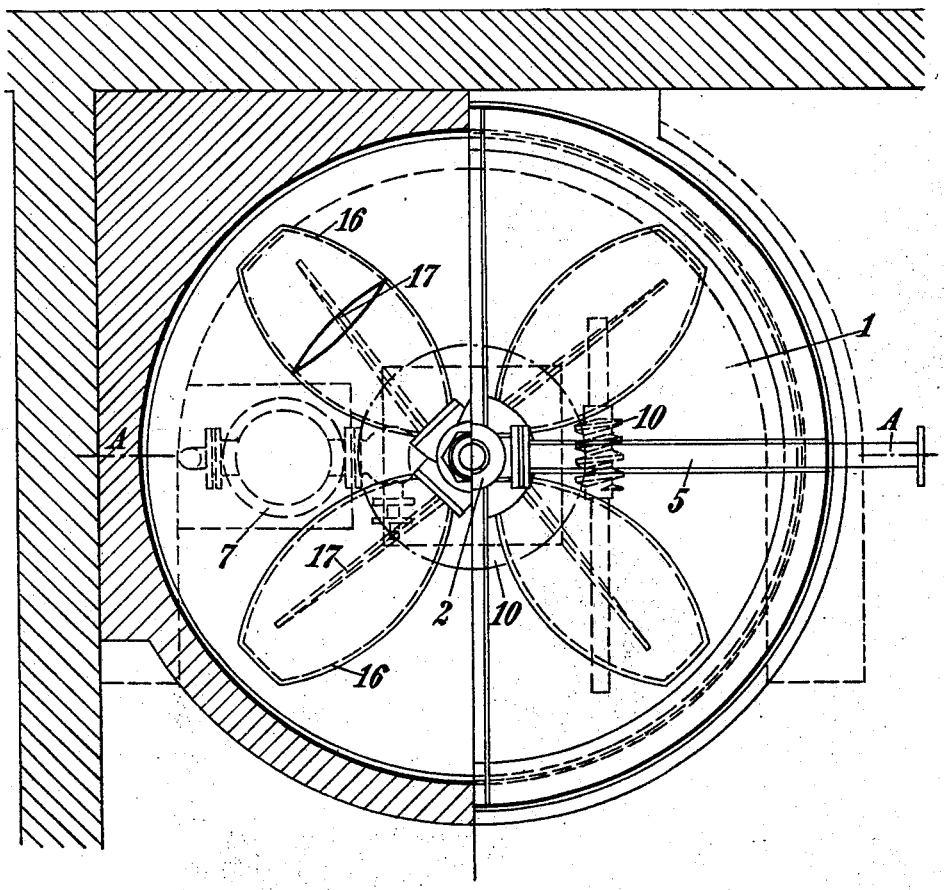
Figure 3:
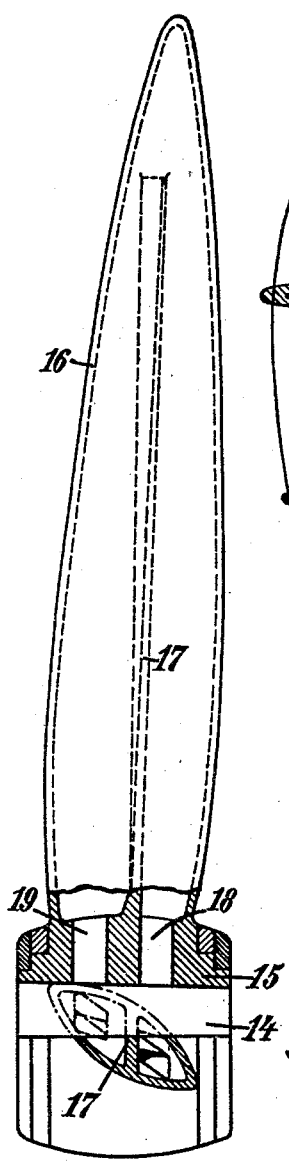
Figs. 3 and 4 are sections of the blade to illustrate the position of the partition.
Figure 4:
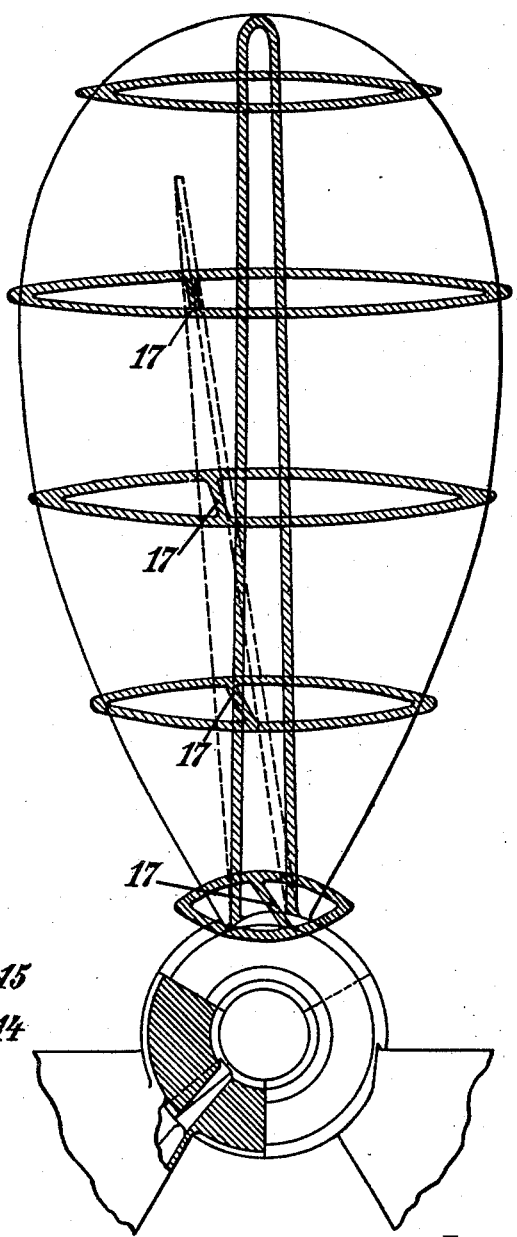

The propeller, with the hub 23 and blades 24, is in this case mounted on the rotatable shaft 22 at the bottom of the tun 21. The said shaft is adapted to be revolved by toothed gear 25 and is connected with conduits 26 and 27 for the supply and exhaust of steam to and from the conduits 28 and 29 in the shaft.

The hub 23 is again so constructed that one end of the conduit of each blade communicates with one duct of the shaft and the other end with the other duct. Steam entering through one conduit—for instance, 27—passes parallelly into one end of all the blades 24, through the conduit therein, and thence through the other shaft-duct and exhaust-conduit—for instance, 26.

The connection between the supply and the exhaust-canals of the shaft and the canals of the blades can, as shown in Fig. 1, be effected in such a way that each end of each blade-canal is connected with the supply and exhaust canal, respectively, by a bore which passes through the cone of the shaft. Under certain circumstances, however, the shaft will be weakened by such construction, and in order to prevent this the arrangement shown in Figs. 6 and 8 for the connection of the canals has been made. From each of the canals 28 and 29 leads one bore only outwardly through the cone and into two conduits that are arranged in the hub of the propeller, and the two ends of each blade-canal are in connection with said conduits, the upper ends with one of the conduits and the lower ends with the other conduit. The conduits might also be arranged in the cone instead of in the wall of the hub if the shaft is not thereby too much weakened for the employment demanded.

The arrangement shown in Figs. 6 and 8 for the supply and the exhaust of the heating agent to and from the blade-canals could, of course, also be used in the form of the invention shown in Fig. 1.

We are aware that propellers similar to those of ships have already been used in stirring apparatus and that for heating and at the same time stirring liquids and the like stirring-arms sometimes in the form of coils and the like through which the heating agent was conducted are known. In our invention, however, a ship's propeller, undoubtedly the stirring device which most efficiently produces circulation, is also used for boiling or heating the fluid by conducting the heating agent through the propeller-blades. A particularly good effect is by this means obtained, owing to the fact that the particles of fluid are repeatedly and continuously brought into contact with the heated blades and caused to circulate. The particular shape of the propeller also allows of providing ducts for steam at very high pressure, so that very high temperatures can be used.

The apparatus can also be used for cooling purposes by driving a cooling agent through the ducts of the propeller-blades.

We claim—

1. In a heating and cooling apparatus the combination with a container, of an agitator therein after the analogy of a ship's propeller comprising a number of blades and having within it a conduit making a complete circuit of each blade thereof; means to supply fluid to one end of said conduit; and means to exhaust from the other end of said conduit.

2. In a heating and cooling apparatus the combination with a container, of an agitator therein having hollow blades after the analogy of a ship's propeller each blade having a partition therein whereby a conduit is formed making a circuit of the blade; a hub supporting said blades and having chambers each in communication with one of the ends of the conduits in the several blades; and means to respectively supply and exhaust said chambers.

3. In a heating and cooling apparatus the combination with a container, of an agitator therein having blades after the analogy of a ship's propeller, comprising a number of blades and each blade having within it a conduit making a complete circuit thereof; a hub supporting said blades and having chambers in communication with the respective ends of the conduits in the several blades; a shaft supporting said hub and having conduits in communication with said chambers and leading respectively from a source of supply and to a point of exhaust; and means to rotate the shaft.

4. An agitator-blade comprising a hollow body of less thickness in one direction than in another, and having a working face to engage the material to be agitated said face being upon the side of the blade extending in the direction of the greatest thickness; a partition dividing the interior of the body into compartments, the partition uniting the walls of the blade in the direction of the least thickness, thereby making a compartment upon each of the respective sides of such partition and the wall constituting the working face comprising a wall to both of said compartments upon the same side of the blade; means of communication between a supply and an exhaust to the respective sides of the partition at one end; and means of communication between the sides of the partition at the other end.

5. In a device of the character specified, the combination of a shaft; channels in the shaft; openings at opposite sides of the shaft and at different distances from the end thereof; a hub mounted to rotate upon said shaft and having chambers in its inner perimeter registering with the respective openings of said channels; and a number of blades carried by the hub and occupying the same radial plane thereon, each blade having a channel surrounding it and commencing at one of the said chambers and ending at the other of said chambers, all of said channels commencing and ending respectively at the same chamber.

GUSTAV BRASELMANN.
FRITZ LÜNNEMANN.

Witnesses:
W. THOS. V. LYNDKER,
CARL Y. SCHMITT.